United States Patent [19]

Oxford

[11] Patent Number: 5,312,127
[45] Date of Patent: May 17, 1994

[54] ALL-TERRAIN WHEELCHAIR

[76] Inventor: Stuart G. Oxford, 13616 N. 78 St., Omaha, Nebr. 68122

[21] Appl. No.: 669,507

[22] Filed: Mar. 14, 1991

Related U.S. Application Data

[63] Continuation-in-part of Ser. No. 594,343, Oct. 9, 1990, Pat. No. 5,149,118, which is a continuation-in-part of Ser. No. 439,612, Nov. 20, 1989, Pat. No. 5,020,818, which is a continuation-in-part of Ser. No. 263,417, Oct. 27, 1988, Pat. No. 4,892,323.

[51] Int. Cl.$^5$ .................. B62M 1/16; A61G 5/02
[52] U.S. Cl. .................. 280/304.1; 280/250.1; 280/253
[58] Field of Search .................. 280/304.1, 250.1, 253, 280/DIG. 10

[56]  References Cited

U.S. PATENT DOCUMENTS

| | | | |
|---|---|---|---|
| 244,084 | 7/1881 | Steinly | 105/129 |
| 441,409 | 11/1890 | Hardy | 280/272 |
| 579,664 | 3/1897 | Mc Conley | 280/272 |
| 654,986 | 7/1900 | Krueger | 280/250.1 |
| 790,853 | 5/1905 | Reddy | 105/129 |
| 913,625 | 2/1909 | David | 105/129 |
| 963,857 | 7/1910 | Broomhall | 254/323 |
| 1,270,104 | 6/1918 | Benton et al. | 180/7.5 |
| 2,592,023 | 4/1952 | Gleason | 180/9.1 |
| 2,979,016 | 4/1961 | Rossi | 115/1 |
| 3,042,131 | 7/1962 | Dovci | 180/27 |
| 3,045,636 | 7/1962 | Thomas et al. | 115/23 |
| 3,301,574 | 1/1967 | Good | 280/211 |
| 3,309,110 | 3/1967 | Bulmer | 280/242 |
| 3,877,725 | 4/1975 | Barroza | 280/242 |
| 3,994,509 | 11/1976 | Schaeffer | 280/242 |
| 4,138,131 | 2/1979 | Sommer | 280/220 |
| 4,354,691 | 10/1982 | Saunders et al. | 280/242 |
| 4,471,972 | 9/1984 | Young | 280/304.1 |
| 4,483,548 | 11/1984 | Zirrilo | 280/304.1 |
| 4,494,937 | 1/1985 | Riermann | 440/11 |
| 4,545,593 | 10/1985 | Farnax | 280/242 |
| 4,558,878 | 12/1985 | Motrenec | 280/272 |
| 4,641,847 | 2/1987 | Busse | 280/242 |
| 4,682,784 | 7/1987 | Anderson | 280/246 |
| 4,732,402 | 3/1988 | Lambert | 280/242 |
| 4,744,324 | 5/1988 | Martinmaas | 114/270 |
| 4,754,825 | 7/1988 | Scheffer | 180/7.5 |
| 4,865,344 | 9/1989 | Romero, Sr. et al. | 280/304.1 |
| 4,926,777 | 5/1990 | Davis, Jr. | 114/270 |
| 5,020,818 | 6/1991 | Oxford | 280/304.1 |

FOREIGN PATENT DOCUMENTS

| | | | |
|---|---|---|---|
| 529233 | 5/1957 | Belgium | 280/250.1 |
| 2716962 | 10/1978 | Fed. Rep. of Germany | 280/304.1 |
| 3814818 | 10/1989 | Fed. Rep. of Germany | |
| 863541 | 4/1941 | France | |
| 23071 | 9/1907 | United Kingdom | 152/208 |

OTHER PUBLICATIONS

Don Kreb's "Access to Recreation" pp. 8 & 16.

Primary Examiner—Mitchell J. Hill
Attorney, Agent, or Firm—Zarley, McKee, Thomte Voorhees & Sease

[57]  ABSTRACT

Attachment is provided for a conventional wheelchair to enable the conventional wheelchair to traverse irregular terrain. The attachment comprises a pair of frame members which are secured to the frame of the wheelchair and which extend forwardly therefrom. A drive wheel is pivotally and rotatably mounted at the forward end of the frame members and has a pair of ratchets secured to the opposite sides thereof. An actuating arm extends upwardly and rearwardly from each of the ratchets and has a handle provided at its upper end. The user of the wheelchair may propel the wheelchair by reciprocating the actuating arm.

3 Claims, 3 Drawing Sheets

ALL-TERRAIN WHEELCHAIR

CROSS REFERENCE TO RELATED APPLICATION

This is a continuation-in-part application of U.S. Ser. No. 594,343 filed Oct. 9, 1990, now U.S. Pat. No. 5,149,118 issued Sep. 22, 1992, which is a continuation-in-part application of U.S. Ser. No. 439,612 filed Nov. 20, 1989 which issued as U.S. Pat. No. 5,020,818, and which is a continuation-in-part application of Ser. No. 263,417 filed Oct. 27, 1988 which issued as U.S. Pat. No. 4,892,323.

BACKGROUND OF THE INVENTION

This invention relates to a wheelchair and more particularly to an attachment for a wheelchair to enable the wheelchair to traverse irregular terrain.

The conventional wheelchair is comprised of two large diameter, ground-engaging, narrow width, pneumatic rear wheels mounted on an axle positioned beneath the seat portion of the chair with smaller diameter, narrow width, pneumatic, ground-engaging wheels positioned forwardly of the rear wheels. The front wheels are pivotally mounted to vertical stanchions and generally are not able to be locked in any particular angular position. The occupant of the wheelchair is seated in a conventional fashion such that the lower portion of the occupant's legs will be generally perpendicular to the ground.

The operator of the conventional-type wheelchair, when using the wheelchair off-road, is faced with a number of problems. The conventional wheelchair also faces difficulties when traversing uneven surfaces or negotiating obstructions in the path. One difficulty is in being unable to proceed any further when a wheel becomes stuck in a depression, such that when the occupant attempts to free himself, the chair may be upset. A similar problem, with the same consequences, occurs when attempting to traverse obstructions—rocks, logs or curbs—in the pathway.

A further problem with a conventional wheelchair is that the user is unable to generate enough sustained human power to climb steep grades. Thus, the conventional wheelchair has limited capability for traversing inclines.

Applicant has attempted to solve the above-enumerated problems with previous inventions. For example, see U.S. Pat. No. 4,892,323 and my pending application, Ser. No. 439,612 filed Nov. 20, 1989 entitled "ALL-TERRAIN WHEELCHAIR." Although the all-terrain wheelchairs of the previous inventions do perform extremely well, it has been found that it may be more economical to provide an attachment for a conventional wheelchair to enhance the capabilities of the conventional wheelchair. Although the instant invention does enhance the capabilities of a conventional wheelchair, it will not have quite the stability or versatility of the previous inventions.

It is therefore a principal object of the invention to provide an all-terrain wheelchair.

A further object of the invention is to provide an attachment for a conventional wheelchair to convert the wheelchair to an all-terrain wheelchair.

A further object of the invention is to provide an attachment for a conventional wheelchair which enables the wheelchair to traverse uneven terrain.

Yet another object of the invention is to provide an attachment for a wheelchair which permits the user to generate greater driving force so that the wheelchair may traverse steep inclines.

Still another object of the invention is to provide an attachment for a wheelchair which is easily secured thereto and which is safe to use.

These and other objects of the present invention will be apparent to those skilled in the art.

SUMMARY OF THE INVENTION

The attachment of this invention includes a pair of elongated frame members having rearward and forward ends with the rearward ends thereof being removably secured to the frame of the wheelchair. A fork is pivotally mounted at the forward end of the frame members and has a drive wheel rotatably mounted thereon. A ratchet means is operatively connected to the drive wheel and has a pair of actuating arms extending upwardly and rearwardly therefrom which are joined at their upper ends. A horizontally extending handle is provided at the upper end of the actuating arms to enable the person using the wheelchair to propel the drive wheel and the wheelchair by selectively reciprocating the actuating arm means.

DESCRIPTION OF THE PREFERRED EMBODIMENT

Figure 1:
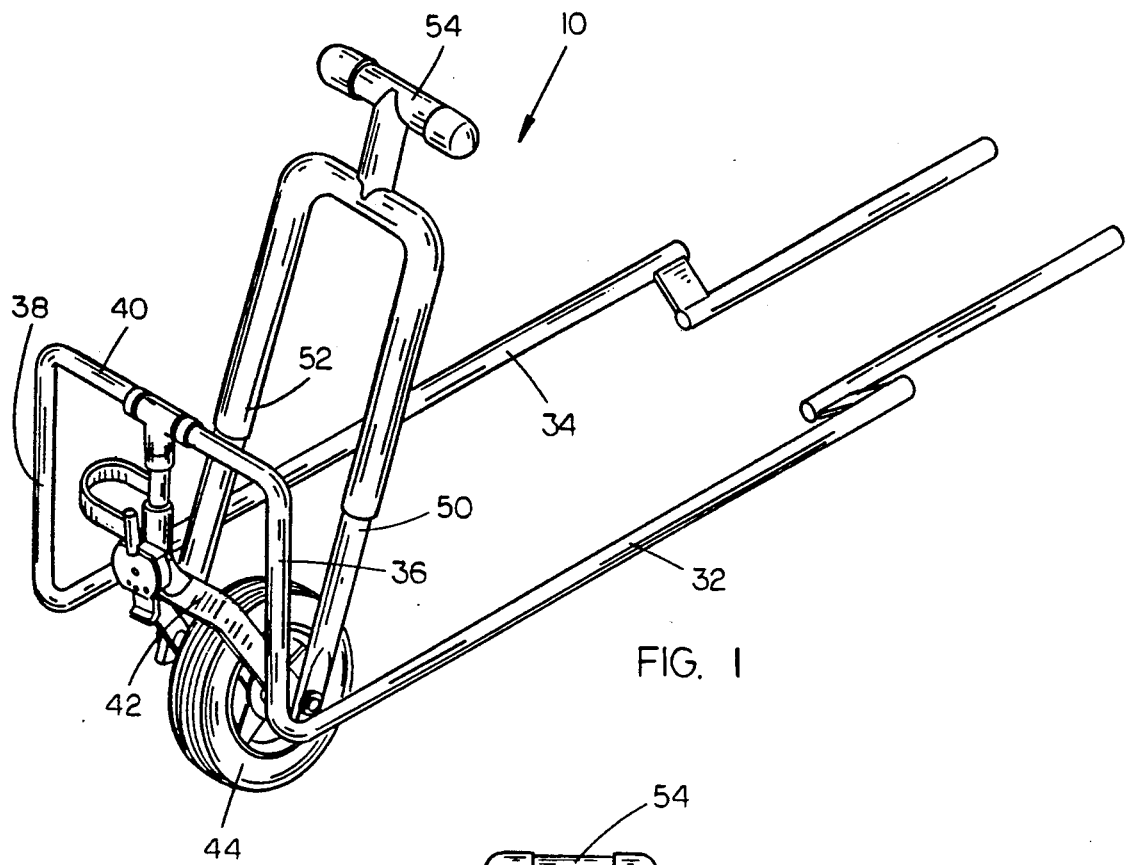
FIG. 1 is a front perspective view of the attachment of this invention.
Figure 2:
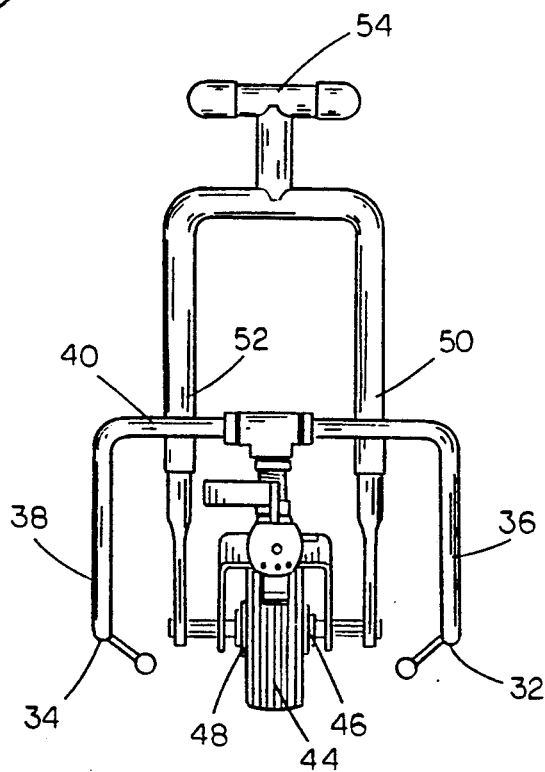
FIG. 2 is a front view of the attachment of this invention.
Figure 3:
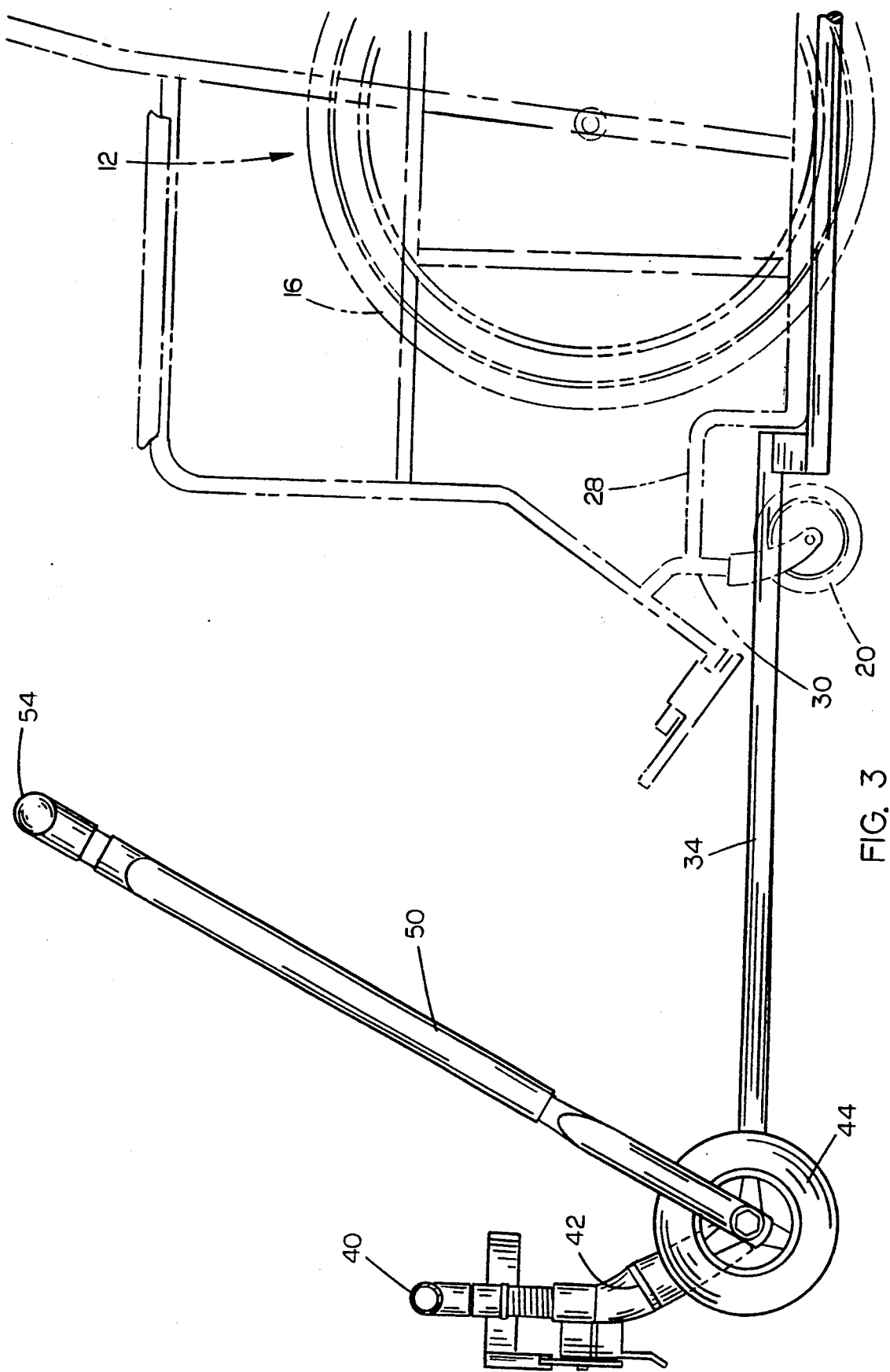
FIG. 3 is a side view of the attachment of this invention with the wheelchair being shown in phantom.

The attachment of this invention is referred to generally by the reference numeral 10 while the reference numeral 12 refers to a conventional wheelchair. Wheelchair 12 includes a frame means 14 having a pair of rear wheels 16 and 18 (not shown) rotatably mounted at the rearward end thereof. A pair of front wheels 20 and 22 (not shown) are pivotally and rotatably mounted at the forward end of the frame means 14 in conventional fashion. Frame means 14 of wheelchair 12 includes a pair of horizontally extending frame members 24 and 26 (not shown) which are positioned inwardly of the wheels 16 and 18. A tubular frame member 28 extends upwardly and then horizontally forwardly from the forward end of frame member 24 and is connected to a vertically extending frame member 30 which has the wheel 20 operatively mounted thereon. The structure at the other side of the wheelchair is identical and will not be described in detail.

Attachment 10 includes a pair of frame members 32 and 34 having rearward and forward ends. Frame members 32 and 34 are provided with upwardly extending portions 36 and 38 at their forward ends which are connected to a top portion 40 having fork 42 pivotally mounted thereon as seen in the drawings. Drive wheel 44 is rotatably mounted in the fork 42 and is provided with ratchet means 46 at one side thereof and ratchet means 48 at the other side thereof. The ratchet means 46 and 48 are conventional in design and are of the type disclosed in my U.S. Pat. No. 5,020,818.

Actuating arms 50 and 52 are operatively connected at their lower ends to the ratchet means 46 and 48 and extend upwardly and rearwardly therefrom as illustrated in the drawings. Actuating arms 50 and 52 are joined at their upper ends as seen in FIG. 1 and are provided with a transversely extending and horizontally disposed handle 54.

The rearward end of frame member 32 may be either secured to the frame member 24 or the frame member 28, depending upon the particular wheelchair being utilized. Precise means of attaching the frame member 32 to the wheelchair does not form a portion of the invention since the same may be secured thereto in a number of ways. For example, clamps could be extended around the frame member 32 and the frame member 24 to rigidly secure frame member 32 thereto. Similarly, frame member 34 is secured to the other side of the wheelchair.

Figure 4:
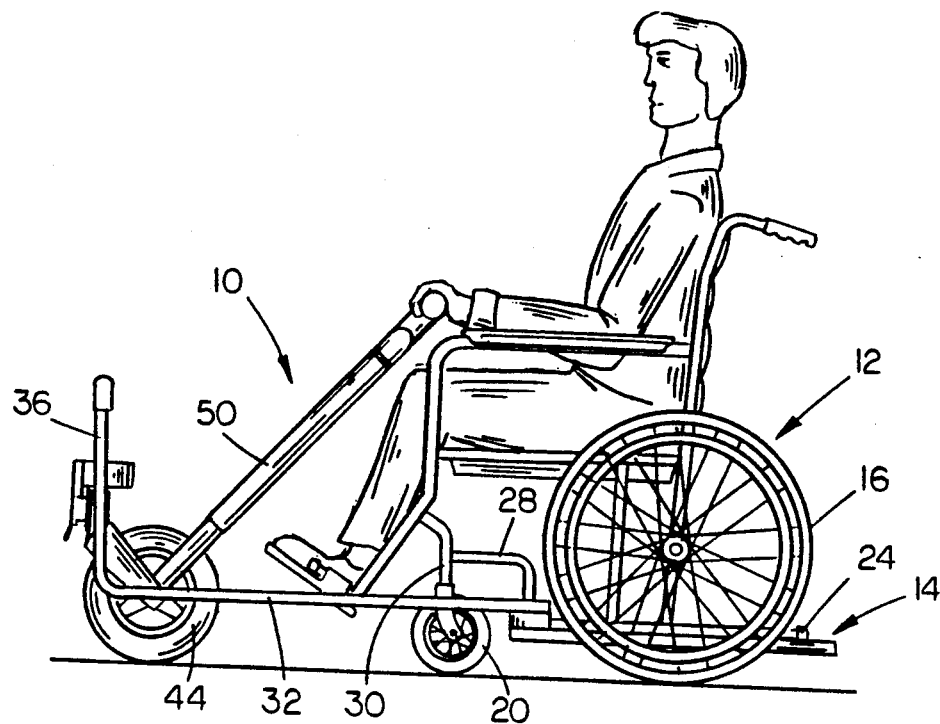
FIG. 4 is a side view of the attachment secured to a wheelchair.
Figure 5:
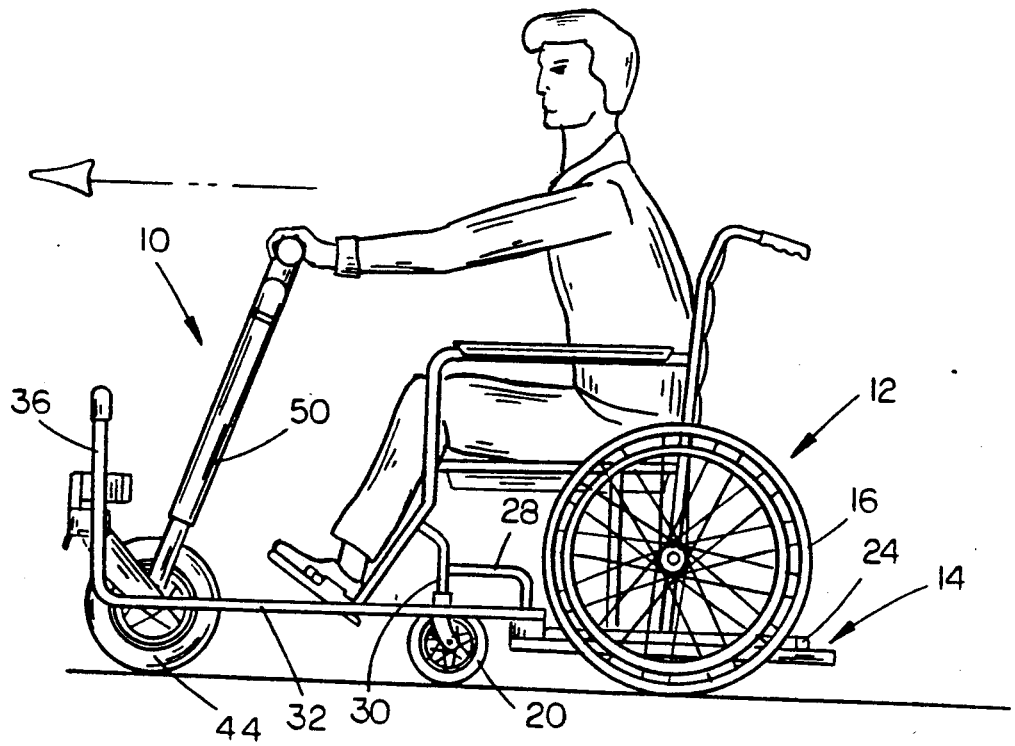
FIG. 5 is a view similar to FIG. 4 but which illustrates the operator of the wheelchair reciprocating the actuating arm.

When the attachment is mounted on the wheelchair as illustrated in FIGS. 4 and 5, the drive wheel 44 is in ground engagement and the actuating arm 50 and 54 extend upwardly and rearwardly towards the person sitting on the seat of the wheelchair. The reciprocation of the actuating arm by the user of the wheelchair will cause the drive wheel to be propelled either a forwardly a rearwardly direction depending upon the mode of the ratchet means which is preferably of the reversible type to enable the wheelchair to either be moved forwardly or rearwardly.

The actuating arm and the ratchets that connect it to the relatively large drive wheel 44 enables the wheelchair to traverse irregular terrain without fear of the wheelchair upsetting. Further, the actuating arm enables the user to apply increased motive power to the drive wheel so that the wheelchair may traverse irregular terrain and inclines.

Thus it can be seen that the invention accomplishes at least all of its stated objectives.

I claim:

1. In combination with a wheelchair including a frame, a pair of rear wheels operatively mounted on the frame, a pair of front wheels operatively rotatably mounted on the frame, a seat on said frame between the rear wheels and a foot rest positioned at the forward end of the frame, comprising, an all terrain attachment secured to the frame of the wheelchair and extending forwardly therefrom, said attachment comprising a pair of elongated frame members having rearward and forward ends, the rearward ends of said frame members being secured to the wheelchair frame, a fork pivotally mounted on the forward end of said frame members, a drive rotatably mounted on said fork means, a ratchet means operatively connected to said drive wheel operable between an engaged position for rotating the drive wheel in a first direction, and a disengaged position permitting free rotation of said drive wheel, and am elongated actuating arm having a lower end operably connected to said ratchet means and an upper end extending upwardly therefrom, said actuating arm connected for pivotal reciprocating movement in a forward direction wherein the arm engages said ratchet means with the drive wheel, and a rearward direction wherein the arm disengages the ratchet means from the drive wheel, whereby the person sitting on the wheelchair seat may propel said drive wheel and the wheelchair by selectively reciprocating said actuating arm means.

2. The combination of claim 1 wherein said actuating arm means extends upwardly and rearwardly from said drive wheel.

3. The combination of claim 1 wherein said actuating arm comprises a pair of arms having upper ends, extending upwardly from said drive wheel and being connected at their upper ends.

* * * * *